Patented Oct. 12, 1954

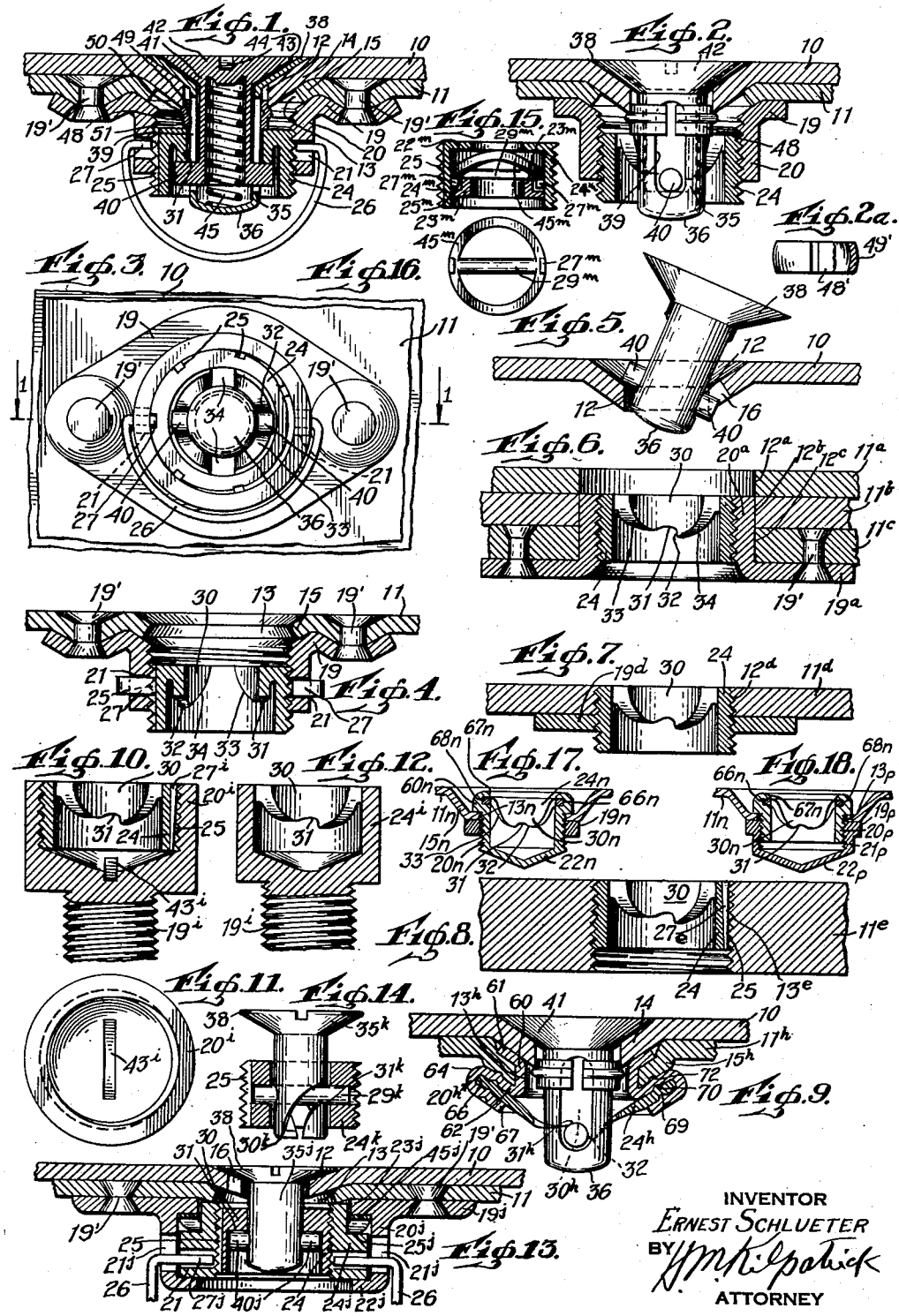

2,691,199

UNITED STATES PATENT OFFICE 2,691,199

FASTENING DEVICE

Ernest Schlueter, Hollis, N. Y., assignor, by mesne assignments, to Simmons Fastener Corporation, Albany, N. Y., a corporation of New York Application September 4, 1945, Serial No. 614,140

28 Claims. (Cl. 24—221)

This invention relates to fastening devices and to means for quickly fastening together two or more members, plates, or layers, and more particularly to devices for attaching various removable plate-like cover pieces to housings and the like, such as cowls to aeroplane fuselage, though it is noted that in some of the claims the invention is not limited to cowls nor even to plate members.

Objects of the invention are to provide an improved device or apparatus of this kind which, both for fastening and unfastening, can be quickly operated by rotation in either direction, and which is particularly suitable for curved plates.

Other objects of the invention are to provide an improved device of this kind which will not accidentally become separated from one of the layers to be joined and cannot be loosened by vibration when in use.

Another object of the invention is to provide a fastening device of this kind adaptable for different thicknesses of material, such device comprising a receptacle adjustably mounted on one member and a fastener engaging the other member and movable into locking engagement in and with the receptacle.

Other objects of the invention are to provide improved receptacles for the fastener, improved means for adjustably mounting the receptacle and an improved fastener for efficiently transmitting the holding stresses to the members to be held together.

Other objects of the present invention are to provide a very short fastening stud which will hold itself in substantial alinement with a hole through which is passes in the curved outer plate or cowling, and which because of its shortness may, while so held, be quickly inserted in the receptacle element and then be turned and locked in place.

To these ends, the present invention provides a fastening device having a stud element engageable with the outer plate in the hole thereof and in the receptacle element on the inner housing or structure, each of said elements being provided with suitably disposed engagement parts and openings therebetween through which the parts of one element may pass to engage the parts of the other element in positions to hold the stud element from outward movement from the receptacle element. Spring means cause the engagement parts of one of said elements to be yieldably engaged with the engagement parts of the other element, and allow the stud element to yield when a tool is pressed into an outer end slot of the stud element and the latter pressed inwardly and rotated to engage and disengage the engagement parts, said spring means being arranged intermediately of the ends of the stud element to allow the latter to be short, and extend nearer the outer end of the stud element than said engagement parts to provide sufficient yieldability to the spring means.

Further objects and structural details will be apparent from the following description of a member of proposed forms of execution of the invention shown in the accompanying drawings in which:

Fig. 1 is a fragmental axial sectional view, partly in elevation, showing one form of the fastening device securing together superposed plate members, the section being taken substantially on the line 1—1 of Fig. 3, looking in the direction of the arrows of said line;

Fig. 2 is a similar axial sectional view, the section being taken substantially at right angles to the section of Fig. 1;

Fig. 2a is a side elevation partly in section of a modification of a detail;

Fig. 3 is a plan of the device of Fig. 1;

Fig. 4 is an axial sectional view, partly in elevation, showing the inner plate and receptacle of Fig. 1, the other parts being removed;

Fig. 5 is a side elevation showing a position in the movement of assembling a fastening device with the outer plate member;

Figs. 6, 7 and 8 are fragmental sectional views, partly in elevation, showing different forms of receptacles and methods of mounting them;

Fig. 9 shows an axial section of another form of the invention;

Figs. 10 and 12 to 14 are axial sectional views partly in elevation, showing further forms of receptacle supports;

Fig. 11 is a plan of the support of Fig. 10;

Fig. 15 shows an axial section of another form of receptacle;

Fig. 16 shows a detail plan view of the spring shown in Fig. 15; and

Figs. 17 and 18 are axial sectional views of other forms of receptacles and supports.

In Figs. 1 to 3 my improved fastening device is shown in combination with, and holding together an outer layer or outer plate member 10 and an inner structure such as the inner layer or plate member 11 disposed face-to-face and having axially alined holes 12 and 13 therethrough, the members being inwardly pressed to form nesting countersinks 14 and 15 around the holes, the hole 12 of the outer plate member being slightly smaller than the other hole and formed without any marginal notch as in Figs. 1 and 2, or with a marginal notch 16 as in Fig. 5.

A receptacle support 19, 20 having a flange portion is secured by rivets 19' fast on the exposed face of the inner plate 11, and has an internally threaded tubular receiving portion 20 axially alined with the holes 12, 13 and having diametric perforations or bores 21 in opposite sides thereof. An externally threaded tubular receptacle 24 has threaded engagement with the threads in said receiving portion and is provided with an uneven number of exterior longitudinal grooves 25 (Figs. 2 and 3) less wide than the diameter of the bores 21 and intersecting the threads; and a bail-shaped spring locking-strip 26 is curved around said receiving portion 20 and has inwardly turned locking ends 27 wider than thick and wider than said grooves and adapted when the bail-shaped part is as in Fig. 3 to engage through said orifices 21 into one of the grooves 25 to lock the receptacle against turning and adapted when turned to the position of Fig. 1 to cause the corners of the ends 27 to cam out of the groove 25 and unlock the receptacle. As the grooves 25 are not diametrically opposite, the number of locking positions is twice as great as the number of grooves.

The inner face of the receptacle element or receptacle 24 is formed with opposite ledges 30 (Fig. 4), each having a shallow recess or engagement part 31 having its bottom facing away from the plate members. A stop 32 is formed on one side of the recess, and a cam face 33 leads from said end of the receptacle nearest the plate members to the side of the recess remote from the stop. The recess 34 (Fig. 3) between the ledges 30 form diametrically opposite longitudinal passages 34 (Figs. 3 and 4) from the interior of the receptacle to the end adjacent to the plate members 10 and 11.

The stud element or fastener 35, 41 comprises a tubular stud 35 (Figs. 1 and 2) passing through said holes 12, 13 and having a closed inner end 36 and an open outer end provided with an outstanding flared flange 38 nested in the countersink 14 of the outer plate member. The stud has opposite longitudinal slots 39 extending to near both ends of the stud and slidably receiving diametrically projecting engagement parts or lugs 40 on the inner end of the tubular lock member 41 longitudinally slidably disposed in said stud. The outer end of the lock member 41 is provided with a closed end wall 42 having an exterior diametric tool-receiving slot 43 and laterally projecting portion to form an annular retaining flange 44 nesting in and against the flange 38 of the stud when said lugs 40 engage the inner ends of the slots 39 of the stud; and a helical compression spring 45 in the lock member is compressed between the outer end wall 42 of the locking member and closed end 36 of the stud.

When the plate members 10, 11 are being assembled the lugs 40 are adapted to pass through said passages 34 between the ledges 30 of the receptacle and are adapted on rotation of the stud to ride on said cam faces 33 to engage the stops 32 and in said recesses 31, where they are held through the action of the spring.

A split ring 48 disposed around the stud between the lugs 40 and outer member 10 has one marginal part 49 snugly engaged in the hole 12 in the outer member, the ring being provided with an intermediate bead 50 engaged on the inner face of the outer member 10 to prevent movement of the ring through the hole in the outer member, thereby to prevent accidental removal of the stud and locking member from the outer plate. The split ring may be opened to remove it from the stud and it may be replaced and reclosed around the stud.

The bead 50 is nearer one edge than the other to give margins 49 and 51 of different widths, whereby the ring may be reversed on the stud to hold the lugs a different distance from the outer member to accommodate members of different thicknesses, the wider margin being disposable nearer the lugs when a thinner outer or inner member is used.

The split ring helps to hold the stud axially alined with the hole 12 and to prevent the stud from wobbling. When in the opening 12 the split ring is held tightly against opening. The height of the ring may be such that it holds the lug 40 up to the upper part of the cam 33 allowing the lug to cam into the recess 31 easily.

The modified form of split ring 48' (Fig. 2a) has an outer spherical face 49' adapted to be received in the hole 12 with a limited ball-and-socket movement to take care of some misalinement of the holes 12 and 13.

It is noted that the diameter of the hole 12 in the outer member 10 is slightly longer than the distance from the outer end of the lug 40 to the opposite side of the stud 35, whereby the stud may be tilted somewhat as in Fig. 5 to pass one lug through the opening and then rotated to pass the other lug through the opening. If the bead 50 or the ring 48 be omitted, the hole 12 should be made smaller, but need then be provided with merely a single marginal notch (Fig. 5) whereupon the stud is adapted on tilting and rotation of the stud to pass the lugs 40 one at a time through said notch as in Fig. 5.

In operation the strip 26 is moved to the position of Fig. 1 and the receptacle 24 is rotated as explained below or in any other desired manner to place it the required distance from the outer plate 10 and is there locked by moving the bail to the position of Fig. 3 inserting an end 27 of the curved locking strip into the adjacent groove 25.

The assembled fastener 35, 41 is tilted and inserted in the outer plate as described somewhat in the manner of Fig. 5, and the split ring 48 is then applied and closed around the stud in the position of Figs. 1 and 2. The assembly is then ready for fastening the members 10 and 11 together.

To fasten the members 10 and 11 together, the members and fastener are placed to bring the hole 12 and the stud 35 in approximate axial alinement with the hole 13 and receptacle 24, with the lugs 40 approximately in the axial plane of the passages 34 (Fig. 3). Then the plate members 10 and 11 are brought together to cause the lugs 40 to pass into the passages 34. The lock member may then be engaged by a screw driver in the slot 43 and pressed inwardly more or less or not at all and rotated to bring the lugs into the recesses 31 (Fig. 4) and against the stop.

If the spring 48 is not too strong or if receptacle 24 is adjusted to bring the bottom wall of the recess 31 near the level of the lug 40, the lock member may be merely rotated to cause the lugs to ride the cams 33 into the recesses. Or the lock member may be pressed inwardly and then rotated to cause the lugs to clear the cams 33 and be released into the recess. Reverse rotation and movement similar to the above cause the lugs to be disengaged from the recesses and to pass into the passages 34 to release the lugs and the fastener.

The relative positions of the parts and the direction of the threads of the receptacle 24 are such that when the receptacle is not locked by the strip end 27 and the lock member is rotated by a tool in the transverse groove 43 to force the lugs against the stops 32, the threads will cause the receptacle to move inwardly and force the lugs 40 against the inner ends of the slots 39 and force the flange 44 of the lock member against the flange 38 of the stud to draw the plate members 10, 11 tightly together, whereupon the parts may be rotated in reverse direction a quarter turn to a final position, at which position the receptacle may be locked in easy operating position by said end 27 of the locking strip.

In Fig. 6 the receptacle support 19a, 20a, secured by rivets 19' to the inner plate member 11a has its tubular portions 20a reversed and disposed in the alined openings 12b, 12c of the plate members 11c, 11b. The receptacle 24 is similar to that of Figs. 1 to 4.

This arrangement adapts the receptacle support for a very thick inner plate member, which may be a single very thick plate or may be made up of a plurality of thick plates or plies 11a, 11b, 11c, which may be suitably secured together.

In the form shown in Fig. 6, the outer plate member such as the member 10 of Fig. 1 engages the plate 11a and is held in place by a fastener 35, 41 as in Fig. 1.

Fig. 7 shows an arrangement suitable for a thick inner plate member 11d thicker than the plate member 11 of Fig. 1, but not thicker than the axial length of the receptacle 24 as in Fig. 1. In Fig. 7 the receptacle support corresponding to the support 19a, 20a of Fig. 6 is omitted entirely and the hole 12d in member 11d is provided with threads to engage the threads of the receptacle 24, the receptacle being locked in place by a jam nut 19d on the threads of the receptacle and engaging the member 11d.

Fig. 8 shows the receptacle of Fig. 1 used with a thick or heavy framework or casting or other inner member 11e having a threaded opening 13e receiving the receptacle 24. The receptacle is locked in place by a wedge or pin 27e driven in one of the grooves 25.

In the form of the invention shown in Fig. 9, the receptacle 24h is held in place on the inner plate member 11h, by a grommet 20h. The outer plate member and the inner plate member 11e are disposed face-to-face and have axially alined holes therethrough, the members being formed with nesting countersinks 14, 15h around the holes, the inner margin of the inner countersink 15h being spaced from the inner margin of the outer countersink 14.

The grommet 20h is formed of relatively soft metal and has a tubular portion 60 disposed in the opening 13h of the inner plate member in the space between said countersinks 14 and 15h. An intermediate part 62 of the grommet is folded on the exposed face of the inner member 11h, and then disposed as at 64, in a direction substantially perpendicularly away from said members to form a receptacle receiving portion receiving the margin 66 of the shallow dome-shaped receptacle 24h, the adjacent margin 67 of the grommet being folded to engage over said margin 66.

The inner margin of the receptacle 24h nearest its center is formed with spaced opposite ledges 30h, each having a shallow recess 31h facing away from the outer member.

The receptacle is made of hard metal and indented to form indentations 69 opening away from the plate members and projections 70 pointing toward and axially alined with indentation 72 of the inner member. The grommet is of softer metal and has the parts thereof registering with said indentations pressed into the indentations and pressed to receive the projections whereby the grommet is held fast in place.

The receptacle 24a is adapted to receive the fastener 35, 41 in a manner that will be understood from Fig. 1.

The form of the invention of Figs. 10 and 11 comprises a bolt-shaped member comprising an internally threaded cup-shaped receptacle support 20i of large diameter and a coaxially threaded bolt extension 19i of much reduced diameter; and an externally threaded tubular receptacle 24 as in Fig. 1, is disposed in said receptacle and has exterior longitudinal grooves 25, the inner face of the receptacle being formed with spaced opposite ledges 30 similar to the ledges of the receptacles of Figs. 1 to 8, each ledge having a shallow recess 31 having its bottom facing toward the bolt extension. The ledges have also associated cams and stops as in Figs. 1 and 2, whereby the receptacle may receive a fastener 35, 41 as in Fig. 1. A wedge or tapered pin 27i is wedged in one of the grooves 25 and engages the receptacle and the inner face of the receptacle support to hold the receptacle in place, and on withdrawal allows the receptacle to be adjusted different distances from the inner structure in which the bolt extension is secured, thereby to accommodate different thicknesses of outer member 10.

Said bolt shaped member is adapted to be received in a correspondingly shaped hole in an inner member of metal, cast or otherwise, which may be very thick; and the bolt extension may be short if desired or long, when greater strength is required. If the inner member is of wood, wood screw threads may be used. The inner member may be provided with a countersink deep enough to receive all or part of the receptacle support 20i; or the receptacle support may project from the inner member. If the deep countersink is raised the bolt shaped member may be adjusted to allow the outer plate to lie flat against a flat inner member, when held by the fastener 35, 41 as in Fig. 1.

If the outer plate 10 is countersunk as in Fig. 1, the inner member may have to be additionally countersunk around the countersink adapter to receive the support 20i.

The bolt shaped member 19i, 20i may itself be adjusted by screwing the bolt extension 19i more or less far into the inner member.

If the inner member is of metal, the small diameter part of the hole is threaded to receive the bolt extension 19i. A transverse slot 43i in the bottom of the cup-shaped support is adapted to receive a screw driver or like tool for inserting or removing the bolt-shaped member.

The invention of Fig. 12 is similar to that of Fig. 10 except that the cup-shaped receptacle 24i itself is provided with the threaded bolt extension 19i and the interior with spaced opposite ledges 30 having the shallow recess 31 facing toward the bolt extension. The receptacle is adjusted relative to the outer member 10 by means of the threads of the extension 19i in the inner member. The ledges serve to receive a tool therebetween for inserting, adjusting or receiving the member.

The operation of the devices of Figs. 5 to 12 will be readily understood in view of the described operation of the fastener of Figs. 1 to 4.

In the form of the invention of Fig. 13, inner and outer superposed plate members 10, 11 have registering holes 12, 13 therein as in Figs. 1 to 5. A support 19j, 20j has a flange 19j mounted on the inner member 11 coaxially with the holes and comprises a tubular portion 20j having substantially opposite longitudinal slots 21j and having around the inner face of the outer and inner ends inwardly disposed flanges 22j and 23j, between which flanges is disposed an internally threaded tubular member 24j slidable within the support, and having diametric bores 21 registering with the longitudinal slots 21j, and having around its inner end an annular groove 25j cooperating with the flange 23j to form an annular spring chamber having therein a corrugated spring washer 45j compressed between said flange 23j and the bottom of the groove.

A tubular receptacle 24 as in Fig. 1 has exterior threads engaged with the threads of the member and exterior longitudinal grooves 25 intersecting the threads, the interior of said receptacle being formed on opposite sides with ledges 30 each having an engagement recess 31 facing away from the members 10, 11.

A bail-shaped spring locking strip 26 wider than thick and wider than the longitudinal grooves 25 has inwardly turned locking ends 27j engaged in the slots 21j and bores 21 and is engageable with one of the grooves 25 when the bail is in the position of Fig. 3 and on the threads and out of the grooves when in the position of Fig. 13.

A stud 35j passing through said holes 12, 13 and provided with an outstanding flange 38 engageable with the outer face of the outer member 10 has integral thereon opposite lugs 40j adapted to engage in said engagement recesses 31, the spring washer 45j yielding to allow the lugs to pass into the recesses and holding them there.

The exteriorly threaded receptacle 24k of Fig. 14 is for use in the member 20j of Fig. 13, and is provided with a holding bar 29k secured fast diametrically across said receptacle. A stud 35k passing through said holes is provided with an outstanding flange 38 engageable with the outer member 10, said stud having oppositely disposed spiral bayonet slots 30k, each open at the free end of the stud to receive the bar 29k and having a recess 31k having an engagement face facing toward the members 10, 11 and adapted to engage said bar, the corrugated spring washer 45j compressed between said flange 23j and the bottom of the groove 25j allowing the recesses to pass onto the bar and holding the recesses on the bar.

The manual operation of the fasteners of Figs. 13 and 14 is substantially the same as that of the fastener of Figs. 1 to 4. The receptacle 24 or 24k may be released by moving the bail part 25 to the position of Fig. 13 as described of the fastener of Figs. 1 to 4, and the plate members may be assembled and the stud 35j or 35k inserted in the receptacle until the lugs 40j are brought into the recesses 31 and against the stops 32 as with the fastener of Figs. 1 to 4, or the closed ends of the recesses 30k brought against the bar 29k. Then the stud 35j or 35k may be reversed a quarter turn and the receptacle locked as described of the fastener of Figs. 1 to 4.

In the form of the invention of Figs. 15 and 16, the externally threaded tubular receptacle 24m is adapted to be used in any of the receptacle supports that receive the receptacle 24 and has around the inner face of the outer end an inwardly disposed flange 22m and longitudinal grooves 25 intersecting the threads. A ring 23m having a force-fit in an intermediate part of the receptacle 24m has opposite exterior peripheral notches 25m and cooperates with the flange 22m to form an annular spring-chamber receiving a spring washer member 45m compressed between said flange 22m and the ring 23m and is provided with upstanding projections 27m slidable in said notches 25m, and with a diametric holding bar 29m disposed diametrically across said receptacle 24m, the spring ring part 45m of the washer member being outwardly curved to engage the flange 22m and hold the ends of the bar 29m against the ring 23m. The receptacle 24m is used with a stud 35k as in Fig. 14, and the stud passing through the holes 12, 13 as in Fig. 1 and being provided with an outstanding outer end flange 38, and having oppositely disposed spiral bayonet slots 30k, each having a recess 31k having an engagement face facing toward said end members and adapted to engage said bar 29m.

As the support for the receptable 24m of Figs. 15 and 16 is the same as in Figs. 1 to 4, and as the stud 35k of Fig. 14 is used therewith, the manipulation of the fastener with the receptacle of Figs. 15 and 16 is the same as for the fasteners of Figs. 1 to 4 and 14. When the recesses 31k pass onto the bar 29m, the spring ring part 45m yields to allow the seating of the bar and then yieldably holds the bar in the recesses while the flange 38 engages the outer member 10.

The constructions of Figs. 17 and 18 provide a water-proof, air-tight hole in the inner plate member 11n for the reception of the fastening device 35, 40 or other suitable fastening device.

As shown in Figs. 17 and 18, the inner plate member 11n has therethrough a stud-receiving hole which in either device may be threaded as the hole 13n of Fig. 17 or unthreaded as the hole 13p of Fig. 18. The member 11n is inwardly pressed as at 15n to form a countersink around the hole, and the member is adapted to receive superposed thereon an outer plate member such as the member 10 having an opening alined with said hole 13n or 13p.

In Fig. 17 is shown an externally threaded receptacle support 20n having threaded engagement with the threads in the hole 13n and having a closed inner end 22n; while Fig. 18 shows a similar support 20p having unthreaded engagement in the hole 13p and having both ends open.

In both Figures 17 and 18, the outer end of said support has an outwardly disposed flange 60n engaged with the outer face of the inner member 11n and then inwardly turned to form an inwardly turned flange portion 67n to form an inner groove 68n between said flange and portion 67n. In said support 20n or 20p is mounted an annular receptacle 24n having a lateral flange 66n clamped in said groove 68n by said flange portion, the receptacle being formed with spaced opposite ledges 30n extending away from the plate members and against the inner face of the support. As in Figs. 6 to 10, each ledge 30n of Figs. 17 and 18 has a shallow recess 31 having its bottom facing away from the inner member, a stop 32 on one side of the recess and a cam face 33 leading to the other side of the recess adapted to receive the lugs 49; but any suitable engagement parts may be carried in the support for receiving other types of fasteners.

A lock nut 19n (Fig. 17) on said support 20n and engaging the exposed face of the inner member holds parts 11n and 20n together in a water-tight, air-tight manner, to prevent any passage of fluid through the opening 12n.

In Fig. 18 an internally threaded cap 21p having a closed outer end 22p and having wrench receiving faces 19p is screwed onto the support 20p and holds together the parts 11n, 20p and 21p in a water-tight, air-tight manner.

The receptacles of Figs. 17 and 18 receive fastening studs as in Fig. 1 operated as in Fig. 1.

This application is in part a continuation of my abandoned application Serial Number 544,717 filed July 13, 1944.

The invention claimed is:

1. A fastening device for securing together superposed outer and inner members having alined holes therethrough; said device comprising a receptacle supported on the inner member and formed on opposite sides with ledges each having an engagement face facing away from the outer member; a tubular stud passing through said holes and having opposite longitudinal slots and means engaging the outer member for holding the stud against inward movement; a tubular lock member in the stud having lugs slidable in the slots and adapted to engage on said engagement faces; means for yieldability urging the lock member outwardly; and a split ring disposed around the stud between the lugs and outer member and having one marginal part engaged in the hole in the outer member, the ring being provided with an intermediate head engaged on the inner face of the outer member thereby to prevent movement of the ring through the hole in the outer member, said ring preventing accidental removal of the stud and locking member from the outer plate.

2. In combination, superposed outer and inner members having alined holes therethrough, the hole of the outer member the outer member having a single marginal notch; a receptacle supported on the inner member and formed on opposite sides with engagement faces facing away from the outer member; a tubular stud passing through said holes and having opposite longitudinal slots and provided with means for holding the stud against inward movement relative to the outer member; a tubular lock member in the stud having lugs slidable in the slots and adapted to engage on said engagement faces; and means for urging said lock member outwardly; the distance between the outer ends of the lugs being greater than the diameter of the hole of the outer member away from the notch; the distance across the hole in the outer member to the outermost part of the notch being slightly longer than the distance from the outer end of one lug to the opposite side of the stud, whereby the stud may be tilted and rotated to pass the lugs on one at a time through the notch and associated opening.

3. In combination, inner and outer superposed plate members having registering holes therein; a tubular support mounted on the inner member coaxially with the holes and having substantially opposite longitudinal slots and having around the inner face of the inner end an inwardly disposed flange; an internally threaded tubular member slidable within the support, and having diametric bores registering with the longitudinal slots; said tubular member having around its inner end an annular groove cooperating with the flange to form an annular spring chamber; a tubular receptacle having exterior threads engaged with the threads of the member and exterior longitudinal grooves intersecting the threads; and a bail-shaped spring locking strip wider than thick and wider than the longitudinal grooves and having inwardly turned locking ends engaged in the bores and engageable with one of the grooves when the bail part is in one position, and on the threads when in another position; said receptacle being formed on opposite sides with ledges each having engagement recesses facing away from the members; a stud passing through said holes and provided with an outstanding flange engageable with the outer face of the outer member; said stud having opposite lugs adapted to engage on said engagement faces; and a corrugated spring washer compressed between said flange and the bottom of the groove to hold the lugs in the recesses.

4. In combination, inner and outer superposed plate members having registering holes therein; a tubular support mounted on the inner member coaxially with the holes and having substantially opposite longitudinal slots and having around the inner face of the inner end an inwardly disposed flange; an internally threaded tubular member slidable within the support and having diametric bores registering with the longitudinal slots; said tubular member having around its inner end an annular groove cooperating with the flange to form an annular spring chamber; a tubular receptacle having exterior threads engaged with the threads of the member and exterior longitudinal grooves intersecting the threads; and a bail-shaped spring locking strip wider than thick and wider than the longitudinal grooves and having inwardly turned locking ends engaged in the bores and engageable with one of the grooves when the bail part is in one position, and on the threads when in another position; a holding bar secured fast diametrically across said receptacle; a stud passing through said holes and provided with an outstanding flange engageable in the outer face of the outer member; said stud having oppositely disposed spiral bayonet slots, each having a recess having an engagement face facing toward the members and adapted to engage said bar; and a corrugated spring washer compressed between said flange and the bottom of the groove to hold the recesses on the bar.

5. In a fastening device, an externally threaded tubular receptacle having around its inner face an inwardly disposed flange; a ring in an intermediate part of the receptacle; a spring member compressed between said flange and the ring and provided with a holding bar disposed diametrically across said receptacle, the spring member having opposite downwardly curved parts engaging the flange to hold the ends of the bar against the ring.

6. In combination, an inner plate member having therethrough a hole and adapted to receive superposed thereon an outer plate member having an opening alined with said hole; an externally threaded receptacle support in said hole having a closed inner end and having at the outer end an outer flange engageable with the outer face of the inner member; means secured in said support forming spaced opposite engagement ledges facing away from the inner member, and a nut screwed on said support and engaging the inner face of the inner member.

7. In combination, an inner plate member having therethrough a hole and adapted to receive superposed thereon an outer plate member having an opening alined with said hole; an externally threaded receptacle support in said hole having an open inner end and having at the outer end an outer flange engageable with the outer face of the inner member; means secured in said support forming spaced opposite engagement ledges facing away from the inner member, and an internally threaded cap screwed on said support and engaging the inner face of the inner member.

8. A tubular stud having opposite longitudinal slots and an outer end head; a tubular lock member in the stud having lugs slidable in the slots; means for yieldably urging the lock member outwardly; and a split ring disposed around the stud between the lugs and the outer end head and pressed by the lugs toward the head.

9. A stud as in claim 8, the outer face of the ring being provided with an intermediate bead.

10. A stud as in claim 9, the bead being nearer one edge than the other.

11. In combination, superposed outer and inner members having alined holes therethrough the hole of the outer member having a single marginal notch; said inner member being provided on opposite sides of its hole with opposite marginal slots and remote from the slots with engagement faces facing away from the outer member; a removable tubular stud passing loosely through said holes and having, near its outer end a flange engageable with the outer face of the outer plate member; a lock member slidably secured to said stud, and having laterally projecting lugs engageable on said engagement faces and adapted to pass through the slots of the inner member and engage said outer member; and a spring secured to the lock member and stud for urging the lock member outwardly to press the lugs against said face to hold the plate members together, or to press the lugs against the outer plate member, when the plate members are separated, to hold the stud substantially axially alined with the hole in the outer plate to facilitate assembly; the distance between the outer ends of the lugs being greater than the diameter of the hole of the outer member away from the notch, the distance across the hole in the outer member to the outermost part of the notch being slightly longer than the distance from the outer end of one lug to the opposite side of the stud, whereby the stud may be tilted and rotated to pass the lugs on one at a time through the notch and associated opening.

12. A fastening device for securing together superposed outer and inner plate members having axially alined holes therein, the inner member having a tubular receptacle supported thereon alined with said hole in the inner member and formed on opposite sides with engagement faces facing away from the outer member, said device comprising a tubular stud passing through said holes and having opposite longitudinal slots having closed inner ends, the stud having an open outer end provided with an outstanding flange engageable with the outer face of the outer plate; a tubular lock member in the stud having lugs slidable in the slots and engageable with said engagement faces, and means to urge said lock member outwardly; the lock member having at the outer end a flange engaging the outer face of said flange of the stud whereby stress may be transmitted from said inner plate member through the receptacle lugs, lock member, lock member flange and the stud flange to the outer plate.

13. A fastening device for securing together an inner member and an outer plate member having aligned holes therethrough, said device comprising a receptacle support fast on the inner member and having an internally threaded tubular portion alined with the holes; a tubular receptacle element having adjustable threaded engagement in said portion; a stud element passing through said holes and having a slotted outer end head engaging the outer face of the outer plate member; each of said elements being provided with radially disposed engagement parts and openings therebetween through which said parts of one element may pass to engage said parts of the other element in position to hold the stud element from outward movement relative to the receptacle element; spring means positioned and mounted to cause the engagement parts of one of said elements to be yieldably engaged with the engagement parts of the other element and to draw the head against the outer plate and to allow the elements to relatively yield to engage and disengage the engagement parts; said receptacle element being rotary in said tubular portion when the stud element is therein and said engagement parts are engaged, for moving the receptacle element to adjusted positions in the support; a stop at one side of each engagement part of one element positioned to stop the engagement parts in engagement; relative positions of the engagement parts and said head and the direction of the threads being such that when the stud element is rotated by a tool in the slot to force the engagement parts of one element against the stops of the other element, the receptacle will move inwardly in a direction away from the outer plate member to force said head against the outer plate member to draw said structure and the plate member tightly together, whereupon the stud element may be rotated in reverse direction about a quarter turn at which position the receptacle element may be left in easy operating position.

14. A fastening device for securing together superposed outer and inner plate members having alined holes therethrough, said device comprising a receptacle support fast on the inner member and having an internally threaded tubular portion alined with the holes; a tubular receptacle having adjustable threaded engagement in said portion, and formed with interior spaced opposite ledges each having a shallow recess having its bottom facing away from the other member and a stop at one side of the recess; a stud element passing through said holes and having an outer slotted head engaging the outer face of the outer member, and lateral lugs adapted to engage in said recesses; and locking means operable from the exterior of said tubular portion and receptacle when the lugs are in said recesses for locking and unlocking the receptacle in adjusted position in the support; relative positions of the lugs, head, recesses and stops and the direction of the threads of the receptacle being such that when the receptacle is unlocked and the stud element is rotated by a tool in the slot to force the lugs against the stops, the receptacle will move inwardly away from the plate members to force the lugs into the recesses, and said head against the outer plate member to draw the plate members tightly together, whereupon the stud element may be rotated in reverse direction about a quarter turn at which position the receptacle may be locked by said locking means in easy operating position.

15. A fastening device for securing together an inner plate member and an outer plate member having alined holes therethrough, the inner plate member having thereon an annular receptacle support portion alined with the holes, said device comprising an exteriorly threaded tubular receptacle element disposed in said annular portion; a stud element passing through said holes and having a slotted outer end head engaging the outer face of the outer plate member; each of said elements being provided with radially disposed engagement parts and openings therebetween through which said parts of one element may pass to engage said parts of the other element in position to hold the stud element from outward movement relative to the receptacle element; spring means positioned and mounted to cause the engagement parts of one of said elements to be yieldably engaged with the engagement parts of the other element and to draw the head against the outer plate and to allow the elements to relatively yield to engage and disengage the engagement parts; locking means operable from the exterior of said tubular portion when the stud element is therein and said engagement parts are engaged for locking and unlocking the receptacle in the support; said locking means including a threaded part having threads engageable with the threads of the receptacle for holding the receptacle against longitudinal movement and means engageable with the receptacle support for locking the receptacle against rotary movement; a stop at one side of each engagement part of one element positioned to stop the engagement parts in engagement; relative positions of the engagement parts and said head and the direction of the threads being such that when the said threaded part is held against rotation while the receptacle is unlocked and the stud element is rotated by a tool in the slot to force the engagement parts of one element against the stops of the other element, the receptacle will be moved inwardly from the outer plate member to force said head against the outer plate member to draw said structure and the plate members toward each other.

16. A device as in claim 15 in which said tubular receptacle element has its exposed end closed in a liquid tight manner.

17. A device as in claim 15 in which said threaded part is in the form of an internally threaded cap having a closed free end.

18. A fastening device for securing together an inner plate member and an outer plate member having alined holes therethrough, the inner plate member having thereon an internally threaded receptacle support portion coaxial with the holes, said device comprising a tubular receptacle element having adjustable threaded engagement in said portion; a stud element passing through said holes and having a slotted outer end head engaging the outer face of the outer plate member; each of said elements being provided with radially disposed engagement parts, and openings therebetween through which said parts of one element may pass to engage said parts of the other element in position to hold the stud element from outward movement relative to the receptacle element; spring means positioned and mounted to cause the engagement parts of one of said elements to be yieldably engaged with the engagement parts of the other element and to draw the head against the outer plate and to allow the elements to relatively yield to engage and disengage the engagement parts; locking means operable from the exterior of said tubular portion when the stud element is therein and said engagement parts are engaged, for locking and unlocking the receptacle element in adjusting position in the support; a stop at one side of each engagement part of one element positioned to stop the engagement parts in engaging position; relative positions of the engagement parts and said head and the direction of the threads being such that when the stud element is rotated by a tool in the slot to force the engagement parts of one element against the stops of the other element, the receptacle will move inwardly in a direction away from the outer plate member to force said head against the outer plate member to draw said structure and the plate member tightly together, whereupon the stud element may be rotated in reverse direction about a quarter turn at which position the receptacle element may be locked by said locking means in easy operating position.

19. A device as in claim 18 in which said locking means comprises a lock nut on the receptacle element threads exterior to the receptacle support position at the side remote from the outer plate and adapted to tightly engage said support portion to lock the receptacle element in place.

20. A device as in claim 18 in which said locking means comprises a lock nut on the receptacle element threads exterior to the receptacle support portion at the side remote from the outer plate and adapted to tightly engage said support portion to lock the receptacle element in place; said tubular receptacle element having its exposed end closed in a liquid tight manner.

21. A device as in claim 18 in which said locking means comprises a lock nut on the receptacle element threads exterior to the receptacle support portion at the side remote from the outer plate and adapted to tightly engage said support portion to lock the receptacle element in place; said lock nut being in the form of an internally threaded cap having a closed free end.

22. A fastening device for securing together superposed outer and inner members having alined holes therethrough, the inner member having fast on a face thereof a receptacle support having an internally threaded tubular portion alined with the holes and pointing in a direction away from the inner member; said device comprising a tubular receptacle open at both ends reversibly disposed in threaded engagement in said portion, and formed with interior spaced opposite ledges each having a shallow recess having its bottom facing away from the outer member; means engageable with said support and said receptacle for locking said receptacle against rotation in reversed or unreversed positions; and a stud element passing through said holes and having a head engageable with the outer face of the outer member, and lateral lugs adapted to yieldably engage in said recesses.

23. A fastening device for securing together superposed outer and inner plate members having alined holes therethrough, the inner member having fast on a face thereof a receptacle support having an internally threaded tubular portion alined with the holes and pointing in a direction away from the inner member, said device comprising a tubular receptacle open at both ends disposed in threaded engagement in said portion, and formed with interior spaced opposite ledges each having a shallow recess having its bottom facing away from the outer member; and a stud element passing through said holes and having a head engageable with the outer face of the outer member, and lateral lugs adapted to yieldably engage in said recesses; said receptacle being reversible in the receptacle support and having threaded engagement with the support in reversed and unreversed positions whereby said members may be so arranged that the receptacle support fast on the inner plate member may be between the plate members while spaced apart, and the plate members held so spaced by the stud element and the lugs engaged in the recesses.

24. A fastening device for securing together superposed outer and inner plate members having axially alined holes therein, the inner member having an annular receptacle supported thereon alined with said holes and formed on opposite sides with engagement faces facing away from the outer member; said device comprising a tubular stud passing through said holes and having opposite longitudinal slots having closed inner ends remote from the plates, the stud having an inner end wall and an open outer end provided with an outstanding flange engageable with the outer plate; a tubular lock member in the stud having an outer end wall, lugs slidable in the slots and engageable with the closed slot ends, and an outer end flange engageable with the outer face of said flange of the stud; a spring in said tubular stud and tubular lock member and compressed between said end walls of the stud and member to urge said lock member outwardly relative to the stud; said flange of the lock member being positioned to engage said flange of the stud at the same time that the stud flange engages the outer plate member and the lugs engage said closed slot ends.

25. A receptacle element for receiving a stud comprising, an internally threaded tubular support having round opposite diametric bores; a tubular receptacle having exterior threads having threaded engagement with the threads in said tubular support; stud engaging means within the receptacle; said receptacle member having a plurality of spaced longitudinal grooves less wide than the diameter of said bores and having abrupt side walls and intersecting the threads; and a bail-shaped locking strip of spring strip material wider than thick and having a radius greater than the radius of said members having integral inwardly turned spring strip locking ends of constant thickness wider than thick and wider than said grooves and engaged in the bores and engageable in one of the grooves and against an abrupt wall thereof when the plane of the locking end is radial to the axis of the receptacle and the plane of the bail part of the strip is in a plane transverse to said axis; whereby when the bail part is moved from said transverse plane to a plane of said axis, the inwardly turned spring strip ends will yield and form cams and cam out of the grooves to withdraw the locking ends from the threads.

26. A receptacle element comprising, an internally threaded tubular support having round opposite diametric bores; a tubular receptacle having exterior threads engaging with the threads in said tubular support; the inner face of the receptacle being formed with opposite ledges, each having a shallow recess having its bottom facing away from one end of the receptacle, a stop on one side of the recess, and a cam face leading from said end to the other side of the recess; the direction of the threads of the receptacle being such that when the receptacle is rotated in the direction away from the stops, the receptacle will move away from said end; said receptacle member having spaced longitudinal grooves less wide than said bores and intersecting the threads; and a bail-shaped locking strip of spring strip material having a radius greater than the radius of said members and having its ends inwardly turned to form locking ends of substantially constant thickness and wider than thick and wider than said grooves and engaged in the bores and engageable one at a time in the grooves to prevent rotation of the receptacle when the plane of the bail part of the strip is in a plane transverse to the axis of the members; whereby, when the bail part is moved from said transverse position the movement will cause the inwardly turned ends to cam out of the grooves to withdraw the locking end from the grooves.

27. A fastening device for securing face-to-face an outer member and an inner plate structure member having registering holes therethrough, the hole of the inner structure member being provided with opposite marginal slots and engagement faces remote from the slots, said device comprising a stud removably loosely disposed in said openings and having, near its outer end a flange engageable with the outer face of the outer plate member; a lock member slidably secured to said stud, and having laterally projecting lugs engageable on said engagement faces and adapted to pass through said slots and engage said outer member; a spring secured to the lock member and stud for urging the lock member outwardly to press the lugs against said engagement faces to hold the members together, or to press the lugs against the outer plate member when the members are separated, to yieldably hold the loose stud substantially axially alined with the hole in the outer plate, while the stud is yieldably movably disposed in the hole of the outer member, to facilitate reassembly of the member; and a removable split ring disposed around the stud between the lugs and said flange and engageable with the inner face of the outer plate member to prevent the device from leaving the outer plate member and adapted to be engaged by the lugs to hold the stud erect for assembly.

28. A fastening device for securing face-to-face an outer member and an inner plate structure member having registering holes therethrough, the hole of the inner structure member being provided with opposite marginal slots and engagement faces remote from the slots, said device comprising a stud removably loosely disposed in said openings and having, near its outer end a flange engageable with the outer face of the outer plate member; a lock member slidably secured to said stud, and having laterally projecting lugs engageable on said engagement faces and adapted to pass through said slots and engage said outer member; a spring secured to the lock member and stud for urging the lock member outwardly to press the lugs against said engagement faces to hold the members together, or to press the lugs against the outer plate member when the members are separated, to yieldably hold the loose stud substantially axially alined with the hole in the outer plate, while the stud is yieldably disposed in the hole of the outer member, to facilitate reassembly of the members; and a ring disposed around the stud between the lugs and said flange and having a curved outer face engageable with the outer plate member at the edge of the hole of the outer plate member to prevent the stud from leaving the outer plate member and adapted to be engaged by the lugs to hold the stud substantially erect.

References Cited in the file of this patent

UNITED STATES PATENTS

| Number | Name | Date |
|---|---|---|
| 690,846 | Eklund | Jan. 7, 1902 |
| 2,123,068 | Summers | July 5, 1938 |
| 2,205,863 | Rauch | June 25, 1940 |
| 2,239,125 | Summers | Apr. 22, 1941 |
| 2,315,335 | Kane | Mar. 30, 1943 |
| 2,369,297 | Johnson | Feb. 13, 1945 |
| 2,378,638 | Johnson | June 19, 1945 |
| 2,391,288 | Barlow | Dec. 18, 1945 |
| 2,406,007 | Eisele | Aug. 20, 1946 |
| 2,407,815 | Churchill | Sept. 17, 1946 |
| 2,425,636 | Parkin | Aug. 12, 1947 |

FOREIGN PATENTS

| Number | Country | Date |
|---|---|---|
| 875,520 | France | June 22, 1942 |
| 462,482 | Great Britain | 1937 |